(12) United States Patent
Handy-Bosma et al.

(10) Patent No.: US 7,430,551 B2
(45) Date of Patent: Sep. 30, 2008

(54) METHOD TO ENFORCE DOMAIN STRONG TYPING

(75) Inventors: John Hans Handy-Bosma, Cedar Park, TX (US); Dan Jeffrey Mandelstein, Austin, TX (US); Mei Yang Selvage, Austin, TX (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/039,509

(22) Filed: Jan. 20, 2005

(65) Prior Publication Data

US 2006/0173845 A1 Aug. 3, 2006

(51) Int. Cl.
*G06F 17/30* (2006.01)
(52) U.S. Cl. .............................. 707/5; 705/37; 714/701; 714/746
(58) Field of Classification Search ...................... 707/5; 705/37; 714/701, 746
See application file for complete search history.

(56) References Cited

U.S. PATENT DOCUMENTS

| | | | |
|---|---|---|---|
| 5,761,493 A * | 6/1998 | Blakeley et al. ................. | 707/4 |
| 6,016,497 A * | 1/2000 | Suver ...................... | 707/103 R |
| 6,110,224 A | 8/2000 | Kawabe et al. ................. | 717/4 |
| 6,151,624 A | 11/2000 | Teare et al. ................... | 709/217 |
| 6,377,953 B1 | 4/2002 | Gawlick et al. ............. | 707/102 |
| 6,792,420 B2 * | 9/2004 | Chen et al. ..................... | 707/3 |
| 2002/0010799 A1 | 1/2002 | Kubota et al. ............... | 709/249 |
| 2002/0095421 A1 * | 7/2002 | Koskas ........................ | 707/100 |
| 2002/0116205 A1 | 8/2002 | Ankireddipally et al. ....... | 705/1 |
| 2003/0100960 A1 * | 5/2003 | Edwards et al. ............... | 700/28 |
| 2003/0195881 A1 * | 10/2003 | Koo et al. ....................... | 707/5 |
| 2004/0153435 A1 * | 8/2004 | Gudbjartsson et al. ......... | 707/1 |
| 2005/0119966 A1 * | 6/2005 | Sandholm et al. ............. | 705/37 |
| 2006/0190471 A1 * | 8/2006 | Lundberg et al. ........... | 707/102 |

* cited by examiner

*Primary Examiner*—Hosain T Alam
*Assistant Examiner*—Syling Yen
(74) *Attorney, Agent, or Firm*—Duke W. Yee; Libby Z. Handelsman; Gerald H. Glanzman (57) ABSTRACT

A centralized method for defining and enforcing strong-typing among domains in RDBMS or ORDBMS is provided to allow flexible, easy, and quick domain creation, as well as facilitating easy implementation and change control on domains. When an application requests data from the database, one or more domains are first identified in the SQL query. A determination is then made as to whether operators for each domain pair in the SQL query are authorized. A determination is also made as to whether functions in the SQL authorized. If the operators and functions in the SQL are authorized, the initial SQL request is rewritten to include a casting formula for each domain pair operation. The rewritten SQL request is then executed.

8 Claims, 4 Drawing Sheets

| OPERATOR | DOMAIN A | DOMAIN B | CASTING FORMULA |
|---|---|---|---|
| = | METER | FOOT | A=B*3.28 |
| > | METER | FOOT | A=B*3.28 |
| < | METER | FOOT | A=B*3.28 |
| + | METER | FOOT | A=B*3.28 |
| * | HEIGHT | WIDTH | NULL |
| ⋮ | ⋮ | ⋮ | ⋮ |

FIG. 7

| Parent_Domain | Child_Domain |
|---|---|
| *INTEGER* | *METER* |
| INTEGER | FOOT |
| Smallint | Band_Level |
| METER | HEIGHT |
| METER | WIDTH |

FIG. 8

| FUNCTION | Parent_Domain | Child_Domain |
|---|---|---|
| *HEX* | *INTEGER* | *METER* |
| SUM | Smallint | Band_Level |
| ⋮ | ⋮ | ⋮ |

FIG. 9

METHOD TO ENFORCE DOMAIN STRONG TYPING

BACKGROUND OF THE INVENTION

1. Technical Field

The present invention relates generally to an improved data processing system. In particular, the present invention provides method, system, and computer instructions for defining and enforcing strong-typing among domains in a database management system.

2. Description of Related Art

Data types in various programming languages or database systems divide data into high-level categories, such as, for example, numeric, character string, date-time, and binary string. A database management system, such as a relational data management system (RDBMS) or object-relational database management systems (ORDBMS) (e.g., DB2 or Oracle), is used to organize, store, and retrieve this data by accepting requests for data from an application program and then instructing the operating system to transfer the appropriate data. Database management systems also are used to ensure the security and integrity of data in the database. Current RDBMS or ORDBMS provide built-in data types, such as integer, characters, or timestamp, to allow for dividing data into data types for further granularity. However, these built-in data types are limited to a handful of categories and are fixed for a given RDBMS release.

Due to the inflexibility and limited number of built-in data types in RDBMS, these built-in data types suffer from a number of drawbacks. For instance, these data types do not adequately solve the business problem on differentiating data into data domains (e.g., separate dollars from pounds, miles from kilometers, etc.). A domain is a valid, complete set of values for an entity's attribute (i.e., column). Domains provide the context of business meaning and the usage of data. For example, U.S. dollar with a value of 1 has a different domain than U.K. pounds with a value of 1, even though both have an integer value of 1. Thus, dollars and pounds belong to different data domains, which have their own business definitions. The built-in data types also cause data ambiguity, as both dollars and pounds are represented as numbers even though they are different monetary units.

Another drawback to the RDBMS and ORDBMS built-in data types is that use of the built-in data types may compromise data integrity and quality if there are no other reliable means to enforce strong-typing among domains. Strong-typing is a process that guarantees that functions and operations can only work on compatible data types or domains. For example, the process that prohibits direct comparison between U.S. dollars and U.K. pounds is strong-typing. However, strong-typing cannot be enforced within similar built-in data types in database systems. Thus, even though the direct operations between dollars and pounds in the above example are not meaningful, database systems cannot prohibit the direct arithmetic operations between these two domain types if they both are defined as numeric data types. Consequently, developers have no way to identify if they have made errors, and database administrators have no way to know whether the data is clean.

In contrast to those built-in data types shipped with RDBMS, user-defined types (UDTs), or abstract data types (ADTs), are data types that are defined by users. User-defined functions (UDFs) are functions are defined by users, in contrast to those built-in functions shipped with RDBMS. UDTs in conjunction of UDFs in certain object-relational databases provide users with more options to granulate the data types into data domains and enforce strong-typing among domains.

Although UDTs and UDFs provide further granularity of data types and enforce strong-typing among domains, these UDTs and UDFs also suffer from numerous shortcomings. Creation and alteration of UDTs and UDFs are cumbersome and inflexible since creation of UDFs is required for domain operations. This inflexibility creates problems when business rules behind the domains change constantly and require on-demand domain creation. In addition, the built-in functions in RDBMS cannot be used on UDTs directly. For example, plus or minus operations must be defined for UDTs. Although the restrictions on usage of functions are sometimes needed, the effort of re-creating functions similar to built-in functions are duplicative and do not take advantage of matured RDBMS capabilities.

Furthermore, the programming interface to use UDTs is cumbersome, as developers are required to memorize allowable UDFs and cast UDTs during SQL coding. UDTs and UDFs add a heavy burden to deployment and administration of applications and RDBMS.

Although applications may also be used to enforce domain strong-typing and valid business rules in many situations, these domain enforcement methods also have severe limitations. Domain strong-typing requires a great deal of programming and coordination effort, especially when numerous applications and large number of developers are involved. The strong-typing and business rules enforcement can become inconsistent depending on how well developers know the rules. With regard to change management, this enforcement is also very difficult since business logic is spread in various places in different applications. In addition, a distributed approach on enforcing domain strong-typing does not allow asset reuse. For example, a reporting system cannot take advantage of existing application's logic checking and enforcing.

Therefore, it would be advantageous to have a centralized method for providing proper domain support in RDBMS or ORDBMS to allow flexible, easy, and quick domain creation, as well as facilitating easy implementation and change control on domains.

SUMMARY OF THE INVENTION

The present invention provides a method, apparatus, and computer program instructions for providing proper domain support in a database management system. With the present invention, a centralized method for defining and enforcing strong-typing among domains in RDBMS or ORDBMS is provided to allow flexible, easy, and quick domain creation, as well as facilitating easy implementation and change control on domains. When an application requests data from the database, one or more domains are first identified in the SQL query. A determination is then made as to whether operators for each domain pair in the SQL query are authorized. A determination is also made as to whether functions in the SQL authorized. If the operators and functions in the SQL are authorized, the initial SQL request may be rewritten to include a casting formula for each domain pair operation if necessary. The database then executes the rewritten request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
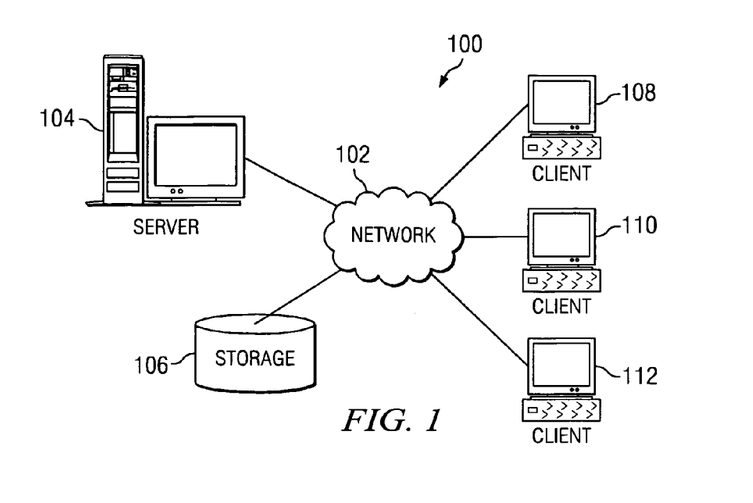
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. A database management system (RDBMS/ORDBMS) may be located within server 104 or storage unit 106.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
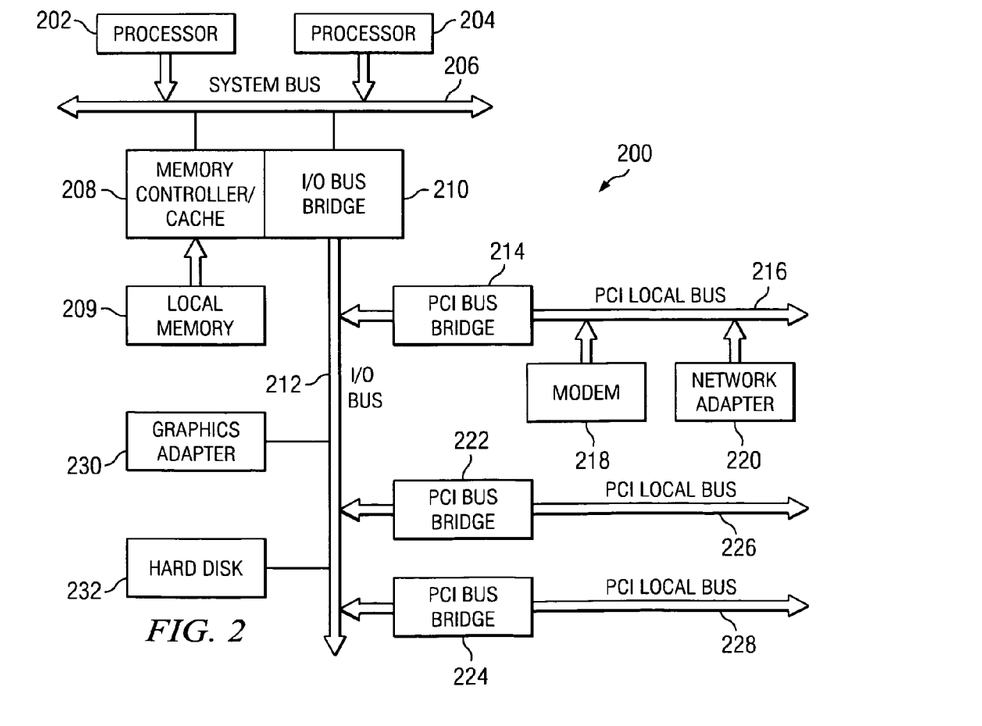
FIG. 2 is an exemplary diagram of a server computing device which may be used to send transactions to elements of a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
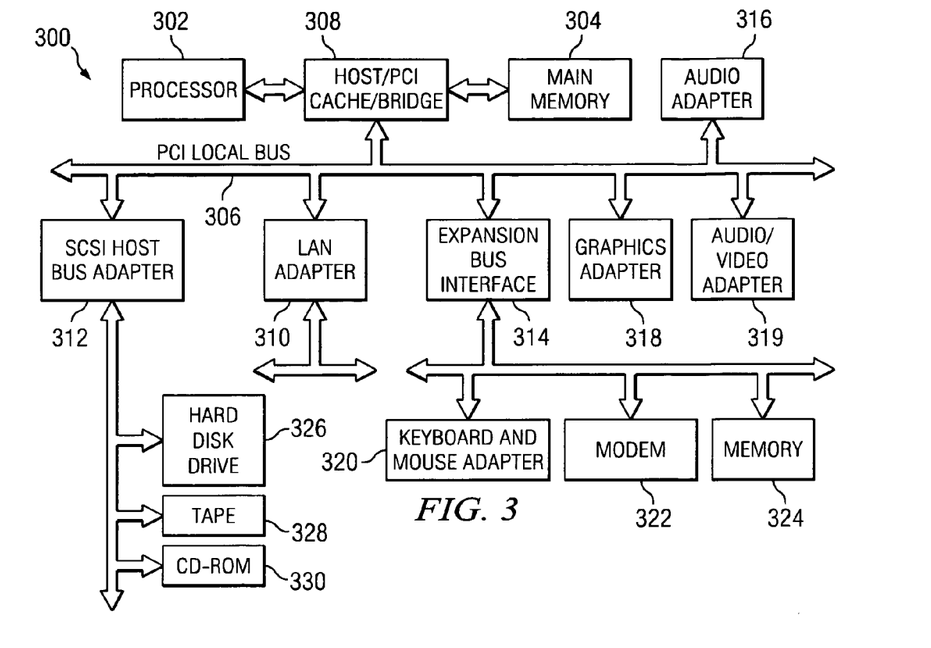
FIG. 3 is an exemplary diagram of a client computing device upon which elements of a preferred embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, the present invention provides a method, apparatus, and computer program instructions for providing proper domain support in relational and object relational database management systems. The present invention builds upon existing database management systems to provide an encapsulated method that allows users to define domains easily by using a set of tables and performing SQL rewrites among different domains. In this manner, the mechanism of the present invention allows for defining and enforcing strong-typing among domains in RDBMS or ORDBMS to ensure data integrity, clarity and quality.

In particular, the mechanism of the present invention provides a set of tables in RDBMS or ORDBMS. These tables are created by a user and populated with data domain definitions, mapping between domains and table columns, operator permissions, function inheritances, and inheritance exceptions. Domain definitions are stored in a Data Domain table. Mapping between domains and table columns is stored in a Mapping table, wherein several columns may be mapped to the same domain. Similarly, an Operator Permission table contains operators, a pair of domains for each operator, and a casting formula for the pair of domains. A Function Inheritance table is used to list the inheritance hierarchy tree among the domains in the domain table. If a domain is a child of another domain, it can use its parent's function by default. Exceptions to the inheritances listed in the Function Inheritance table are listed in an Inheritance Exception table. The Inheritance Exception table is used to determine which particular functions a parent has that the child is not allowed to use.

In one embodiment, the present invention is implemented as a plug-in to an application. An application rule engine is provided to act as a domain security layer between applications and the database. This implementation is very flexible and extensible without relying on the database manager. All standard query language (SQL) statements will pass through this layer before being executed by the database. SQL statements pass through this layer either at compile time in the case of static SQLs, or at runtime in the case of dynamic SQLs. Once the tables listed above have been created and populated with data, an application rule engine will act as a domain security layer between applications and database. The application rule engine compares the columns contained in the SQL statement to the domain table. For example, when a client issues 'select * from table', since asterisk sign encompasses all the columns in a table and does not list column names, the application rule engine may obtain column names in the SQL statement by sending the SQL statement to the database engine and requesting the column names in the SQL statement that are also present in the Domain table. Alternatively, the application rule engine may compare the column names in the SQL statement against a subset of a local cached database catalog, which contains a list of names for tables and columns in RDBMS/ORDBMS.

If the application rule engine determines that the SQL statement contains domains, the application rule engine authorizes the operator permission based on the entries in the operator permission table and performs a query rewrite to cast domain types and apply the correct casting formula if needed. For instance, as mentioned previously, the Operator Permission table stores entries that identify allowable operations between two domains. The Operator Permission table also stores a casting formula for each domain pair, which provides a formulaic relationship between the pair.

In addition, the present invention differentiates operators from functions to allow the program to easily obtain and apply the formula for casting. The application rule engine authorizes the functions (built-in or user-defined) based on entries in Function Inheritance and Inheritance Exception tables. Once the operator permission and functions are authorized, the application rule engine rewrites the query based on the casting formula in the operator permission table. Finally, database engine will execute the rewritten SQL statement.

The present invention may also be implemented as a plug-in or extender to a database. The set of tables—domain, mapping, operator permission, function inheritance, and inheritance exception—may be added as part of system catalog tables or user-created tables in RDBMS or ORDBMS. A database engine or stand-alone plug-in may validate operations among domains and function permissions, and rewrite the SQL statements based on the casting formula.

The present invention provides many advantages over existing relational database management systems by providing an easy, fast, and flexible way to define data domains and enforce strong-typing. The mechanism of the present invention allows a user to easily insert and modify data. The hassle-free approach of the present invention encourages users to take stewardships to guard and understand data and make better decisions based on a correct understanding. As developers do not need to provide casting among different UDTs, a programmer does not need to know the converting rules and perform the complicated conversion among different types. Developers or database administrators also do not need to create UDTs/UDFs for sub-data types, which allows for reducing development, deployment, and lifetime costs. The present invention also allows for enforcing business rules at one centralized place, thereby ensuring consistency and standardization. Web services may also be enabled to invoke the on-the-fly casting formula once data domain and rules are defined. For instance, since the conversion between dollars and pounds may fluctuate depending on currency rate, web services will be used to fetch dynamic converting rules. More details on web services will be described later.

Furthermore, the present invention facilitates metadata and information integration. Domain information is metadata that accurately and consistently describes data in the business context. Clear and consistent definition of domains not only ensures data integrity prior to the data warehouse stage, but also allows a metadata integrator to easily discover, import, search, and model existing data sources.

Figure 4:
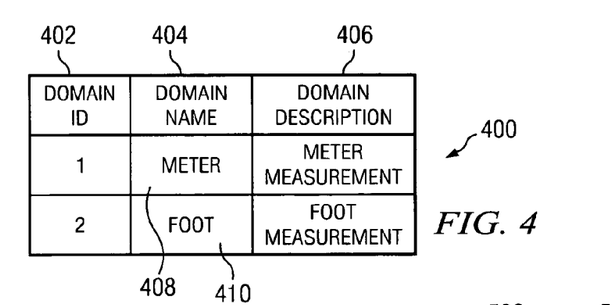
FIG. 4 is an exemplary diagram of a data domain table in accordance with the present invention.
Figure 5:
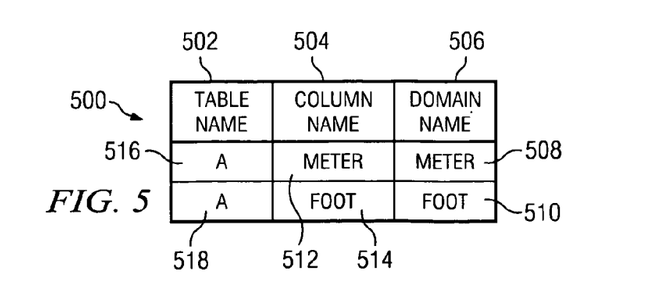
FIG. 5 is an exemplary diagram of a mapping table in accordance with the present invention.

Turning now to FIGS. 4 and 5, an exemplary data domain table and a mapping table in accordance with a preferred embodiment of the present invention are illustrated. In particular, the data domain table depicted in FIG. 4 is used to record all of the domains according to the system's business rules (i.e., rules directly related to the domains that the system must enforce). The data domain table in FIG. 4 and the mapping table in FIG. 5 may be located in a database management system, such as RDBMS or ORDMS. The data domain table may be implemented as part of system catalog tables or as user-created tables.

In illustrative example of FIG. 4, data domain table 400 comprises multiple columns, including domain ID 402, domain name 404, and domain description 406. Domain name 404 column is shown to contain two domains, Meter 408 and Foot 410, and domain description 406 column contains their respective definitions.

The mapping table in FIG. 5 is used to provide the mapping between domains specified in the Domain table and columns in a particular table. For example, mapping table 500 comprises multiple columns including table name 502, column name 504, and domain name 506. For domain Meter 508, a mapping is shown between Meter column 512 in column name 504 and Table A 516 in table name 502. Likewise, mapping table 500 includes a mapping for domain Foot 510 between Foot column 514 and Table A 518 in table name 502. Although the illustrative example depicts a single column mapped to each domain in Domain table 400 in FIG. 4, it should be noted that several columns may also be mapped to the same domain.

Figure 6:
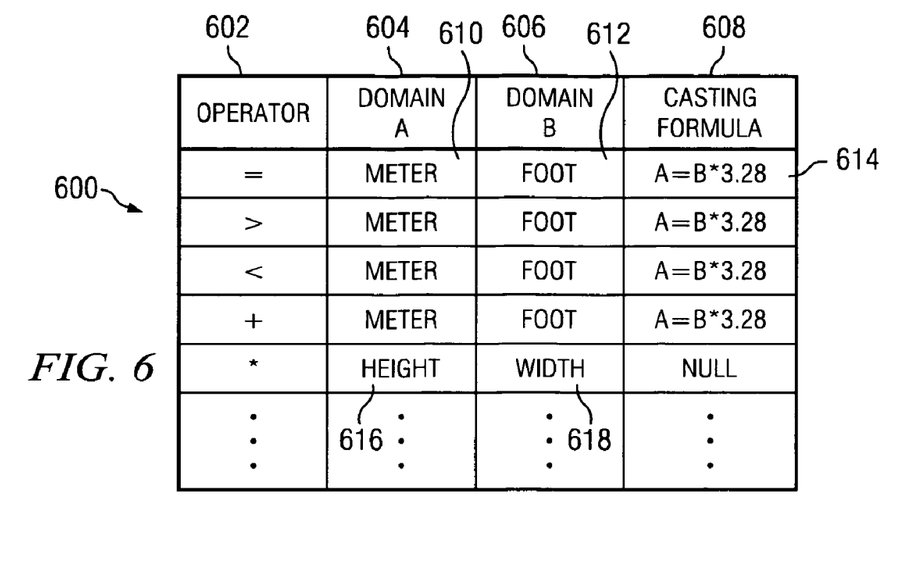
FIG. 6 is an exemplary diagram of an operator permission table in accordance with a preferred embodiment of the present invention.

FIG. 6 shows an exemplary diagram of an operator permission table in accordance with a preferred embodiment of the present invention. The operator permission table stores allowable operations between two domains. In other words, the operator permission table is used to provide a list of which domains in Domain table 400 in FIG. 4 are allowed to operate together based on a true condition. If two domains are allowed to operator together, the operator permission table also includes the casting formula that the domains should use when working together.

For example, Operator Permission table 600 is shown to include the following columns: operator 602, domain A 604, domain B 606, and casting formula 608. If presented with a "=", "<", ">", or "+" operator, Operator Permission table 600 shows that Meter domain 610 may operate with Foot domain 612 if the correct casting formula 614 is applied. However, Meter domain 610 is not allowed to work together with a Dollar domain, for example, since there is no Meter and Dollar pair in Operator Permission table 600.

For example, if an application issues the following SQL:

SELECT * FROM measure WHERE
COLUMN_A>COLUMN_B the application rule engine makes a determination whether the domains in the SQL query are allowed to operate together. In this example, Column_A represents Meter domain 610, and Column_B represents Foot domain 612. As Operator Permission table 600 contains an entry having an ">" operator for Meter domain 610 and Foot domain 612, the operator permission in the SQL query is authorized in this example.

Although operators are typically considered as functions by database engine, operators are differentiated from functions in the present invention. This differentiation is used so the program may easily obtain and apply the formula for casting. Casting formulas are highly flexible and may be invoked based on Web services. For example, while some domain pairs may operate together with a fixed casting formula, other domain pairs, such as those dealing with currency, may need to be updated as necessary. Thus, Web services may be used to invoke an updated casting formula for a domain pair of U.S. dollars and U.K. pounds based on current rates of exchange. Last, the formula does not exclude user-defined types. In other words, UDTs may be stored as domains and subject to casting formula, which allows the present invention to be compatible with existing RDBMS/ORDBMS technology.

Figure 7:
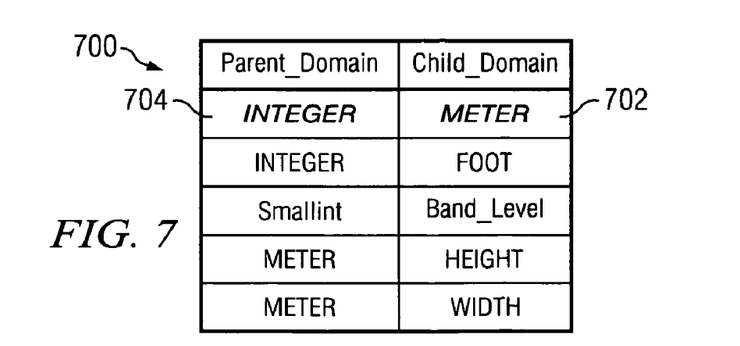
FIG. 7 is an exemplary diagram of a function inheritance table in accordance with a preferred embodiment of the present invention.
Figure 8:
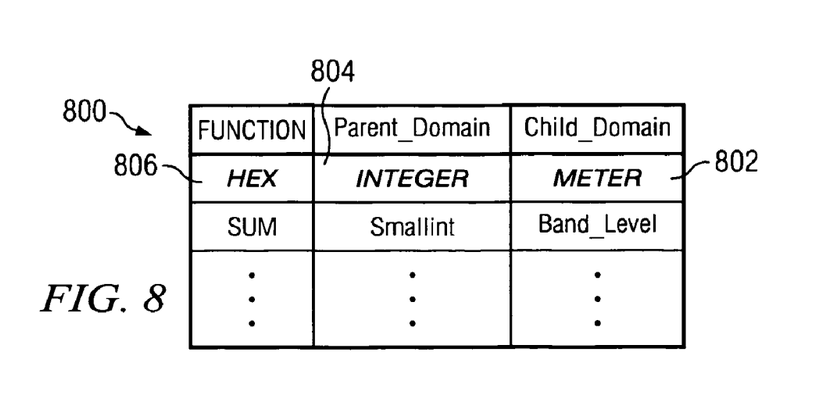
FIG. 8 is an exemplary diagram of an inheritance exception table in accordance with a preferred embodiment of the present invention.

Once the operator permissions are authorized, the application rule engine then determines whether functions in the SQL statement are allowed based on a function inheritance table and an inheritance exception table, as illustrated in FIGS. 7 and 8. In particular, FIG. 7 is an exemplary diagram of a function inheritance table in accordance with a preferred embodiment of the present invention. A Function Inheritance table records the hierarchy relationships among domains. A child domain inherits its parent's all functions by default. For example, in Function Inheritance table 700, if Meter 702 is defined as a child domain of Integer 704, all the built-in functions for Integer 704 will be available for Meter 702. In this manner, the present invention takes advantages of the function powerhouse of RDBMS. User defined functions may also be inheriting.

In this example, the application rule engine authorizes functions in the SQL query based on the inheritances specified in Function Inheritance table 700. As mentioned previously, RDBMS contains built-in data types that may be used to define the data. If the application rule engine is presented with a SQL query such as, for example:

SELECT Avg (METER) FROM MEASURE the application rule engine with authorize the SQL query based on the entry in Function Inheritance table 700, since the AVG function is a valid function for built-in data type Integer.

It should be noted that each child domain shown in Function Inheritance table 700 is restricted to only inherit from one parent domain. A child domain is restricted to a single inheritance philosophy in order to ensure data integrity. Otherwise, to if a domain can belong to multiple parent domains, the application rules engine would be not be able to determine to which particular parent domain a column in the SQL statement should belong.

However, even though an inheritance is found in Function Inheritance table 700, the application rule engine checks for exceptions to the inheritance in an inheritance exception table. FIG. 8 illustrates an exemplary inheritance exception table in accordance with a preferred embodiment of the present invention. Function Inheritance Exception table 800 stores the parent's functions that the child domains are not allowed to use. For example, even though Meter 702 inherits all functions of parent domain Integer 704 in FIG. 7, functions specified in Inheritance Exception table 800 shows that Meter 802 does not inherit HEX function 806 from Integer 804. Thus, the following SQL statement SELECT Hex (METER) FROM MEASURE is not permitted since there is an entry in Inheritance Exception table 800 that specifies that child domain Meter 802 does not inherit Integer's 804 HEX function 806.

Once the operator permissions and functions are authorized, the application rule engine will rewrite the SQL query based on the casting formula specified in the Operator Permission table. For example, the SQL SELECT * FROM measure WHERE
COLUMN_A>COLUMN_B is rewritten using the casting formula "A=B*3.28" 614 specified in the Operator Permission table. Thus, the initial SQL is rewritten to the following SQL:

SELECT*FROM measure WHERE COLUMN_A>
(COLUMN_B)*3.28

As one meter is equivalent to 3.28 feet, casting formula 608 in FIG. 6 allows Meter domain 610 and Foot domain 612 to work together by multiplying 3.28 to the Foot column. Thus, a casting formula is used to rewrite SQL statements if needed. An example of when a SQL rewrite is not needed is also shown in Operator Permission table 600, which includes an entry for multiplying Height domain 616 and Width domain 618. Since no casting formula is associated with this entry, a SQL rewrite is not performed for this domain pair operation. The SQL rewrite is beneficial in that programmers neither need to know that columns in the SQL statements belong to different domains/subtypes, nor do programmers need to perform the explicit casting during programming.

Figure 9:
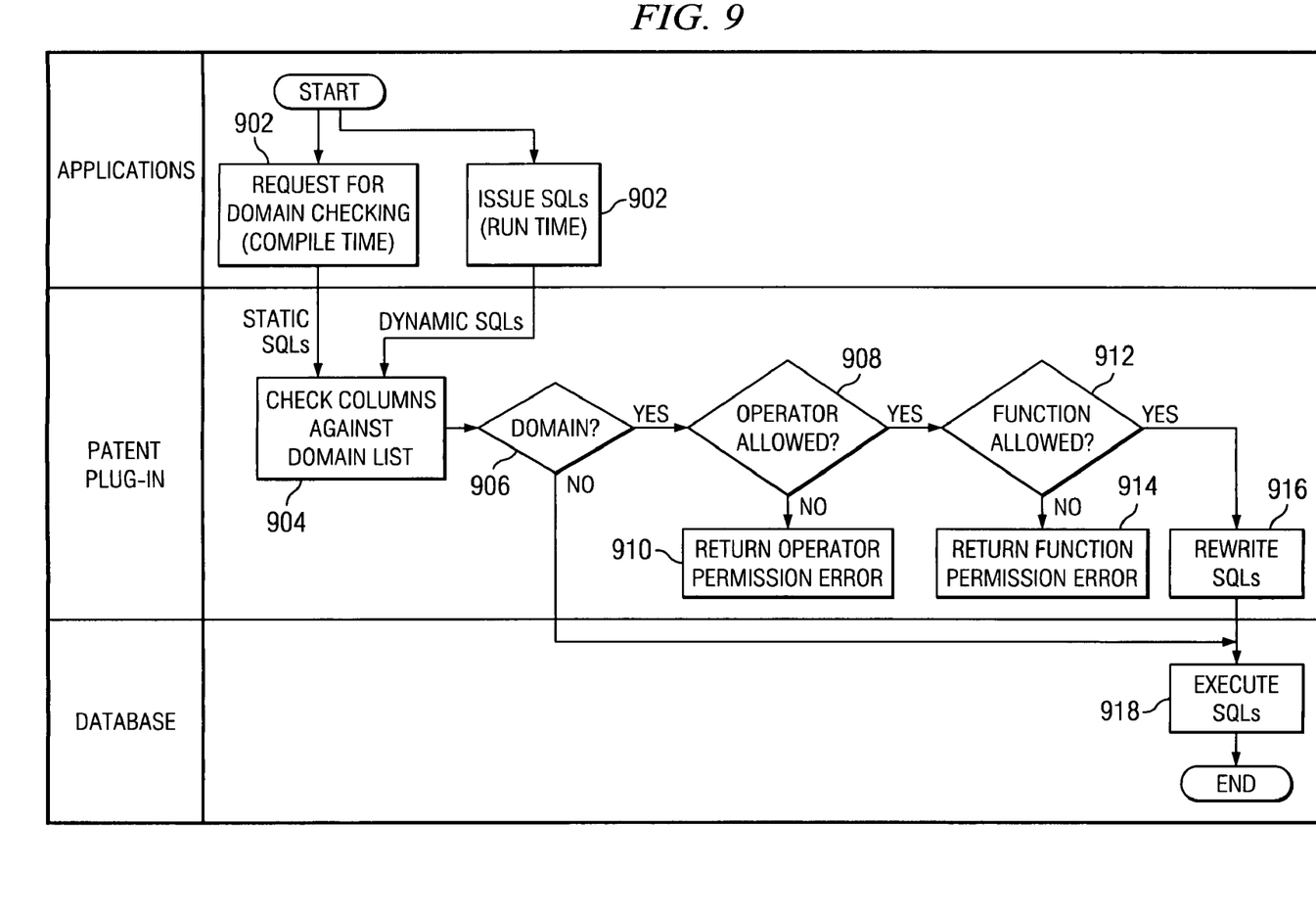
FIG. 9 is a flowchart outlining an exemplary operation for defining domains and enforcing strong-typing among domains in RDBMS or ORDBMS in accordance with a preferred embodiment of the present invention.

FIG. 9 is a flowchart outlining an exemplary operation for defining domains and enforcing strong-typing among domains in accordance with a preferred embodiment of the present invention. Prior to implementing the process in FIG. 9, a set of tables are created by a user and populated with data domain, mapping, operation permission, function inheritance, and inheritance exception information. Although the user may initially populate the set of tables when the tables are created, the user or the application may update these tables at a later time as necessary. The process illustrated in FIG. 9 may be implemented within a plug-in to an application or a plug-in or extender to a database.

The process begins by having an application issue a request for data (step 902). This application request may be in the form of a dynamic SQL query if the SQL is issued at runtime, or in the form of a static SQL if the request is to check domains at compile time. When a request for data is received from an application, the application rule engine compares the columns in the SQL statement against a domain list (step 904). The application rule engine may obtain the column names contained in the SQLs by first sending the SQLs to the database engine, and then requesting the database engine identify the column names that the SQLs touch. Alternatively, the application may itself check the columns in the SQLs against a domain list in a local cached database catalog. In this manner, an application rule engine acts as a domain security layer between applications and the database. All SQLs pass this domain security layer before they are allowed to be executed by the database. This domain check may be performed either at compile time for static SQLs, or alternatively at run time for dynamic SQLs.

Based on the comparison, the application rule engine makes a determination as to whether the request contains domains (step 906). If the request does not contain domains, the application rule engine sends the request to the database, which executes the SQL (step 918).

Turning back to step 906, if it is determined that the request contains domains, a determination is made as to whether the operator permissions in the request are authorized (step 908). In authorizing the operators, the application rule engine checks the Operator Permission table to determine if the table contains an entry for a pair of domains in the SQL for the particular operator specified. If an entry does not exist in the Operator Permission table, an operator permission error is returned (step 910), with the process terminating thereafter.

Turning back to step 908, if an entry is located, the operator permission is authorized. A determination is then made as to whether functions specified in the request are authorized (step 912). For example, the application rule engine may authorize the functions based on entries in Function Inheritance and Inheritance Exception tables. These functions may be built-in or user-defined. The application rule engine first checks to see if there is an entry in the Function Inheritance table for the domain in the SQL statement. If it is determined that the table contains the domain, the domain associated with the parent domain in the table is allowed to inherit the parent domain's functions in the entry by default. If the parent domain is authorized to use the function specified in the SQL, the child domain is authorized to use the function as well. If an entry does not exist in the Function Inheritance table, a function permission error is returned (step 914), with the process terminating thereafter.

Turning back to step 912, if an entry is located in the Function Inheritance table, the application rule engine also checks the Inheritance Exception table to see if there are any exceptions to the child domain inheriting all of the associated parent domain's functions, and if so, whether the particular function in the SQL is listed as an exception. If such an entry exists in the Inheritance Exception table, a function permission error is returned (step 914), with the process terminating thereafter.

If an entry does not exist in the Inheritance Exception table (i.e., the child domain inherits all of the parent domain's functions), the application rule engine then performs a query rewrite to cast domain types and apply the correct casting formula as specified in the Operator Permission table as needed (step 916). The application rule engine passes the rewritten SQL to the database engine, which executes the SQL in its rewritten format (step 918).

Thus, the present invention provides a mechanism for allowing proper domain support in relational and object relational database management systems. The advantages of the present invention should be apparent in view of the detailed description provided above. One can use built-in data types in RDBMS/ORDBMS, UDTs and UDFs, and domain-strong typing in applications to define data domains and enforce strong-typing. However, these existing methods have proven to be difficult, time-consuming, and may result in compromised data integrity and quality. In contrast, the mechanism of the present invention not only allows for defining domains and enforcing strong-typing among domains in RDBMS or ORDBMS in a flexible, quick, and easy manner, but it will also help ensure data integrity, clarity, and quality, and thus reduce problems caused by data inconsistencies.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing domains in a database management system, comprising:

responsive to receiving a request for data from an application, identifying at least one domain pair in the request, wherein a domain differentiates usage of data according to business rules for a column in the request, wherein each column in the request is defined as being in a specific domain, wherein each domain pair comprises two specific domains of two columns in the request, and wherein each domain pair is associated with an operator in the request that operates on the two columns;

determining if operators for each of the at least one domain pair identified in the request are authorized, wherein each of the at least one domain pair is associated with permissible operators, and wherein the step of determining if operators for each of the at least one domain pair identified in the request are authorized further comprises comparing the operators for each of the at least one domain pair identified in the request with the permissible operators;

determining if functions in the request are authorized, wherein the functions in the request are associated with specific domains of columns in the request; and responsive to determinations that the operators and functions are authorized, rewriting the request to include a casting formula for each domain pair operation to form a rewritten request;

wherein the step of determining if operators for each of the at least one domain pair identified in the request are authorized is performed by checking a first table in order to locate an entry containing a permissible operator for each of the at least one domain pair;

wherein the step of determining if functions in the request are authorized is performed by checking a second table to identify if the specific domains of the columns in the request associated with the functions are allowed to inherit functions specified in the request from a parent domain, and by checking a third table to identify exceptions to the inherited functions identified using the second table.

2. The method of claim 1, wherein the identifying step includes comparing column names in the request against a domain list.

3. The method of claim 1, wherein the identifying, determining, and rewriting steps are performed by an application rule engine.

4. The method of claim 1, wherein the identifying, determining, and rewriting steps are performed by a database engine.

5. The method of claim 1, wherein the request is issued at one of compile time or runtime.

6. The method of claim 1, wherein the request is a structured query language query.

7. The method of claim 1, wherein the identifying step further comprises:

sending the request to a database engine to obtain the column names in the request.

8. The method of claim 2, wherein the domain list is located in a local cached database catalog.

* * * * *